Dec. 15, 1959 S. MIHANOWICH 2,917,643
ELECTRICAL MACHINE ELEMENT AND METHOD OF MAKING SAME
Filed June 27, 1956 2 Sheets-Sheet 1
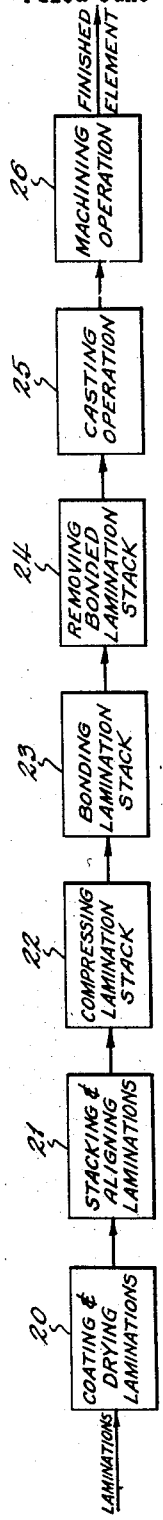
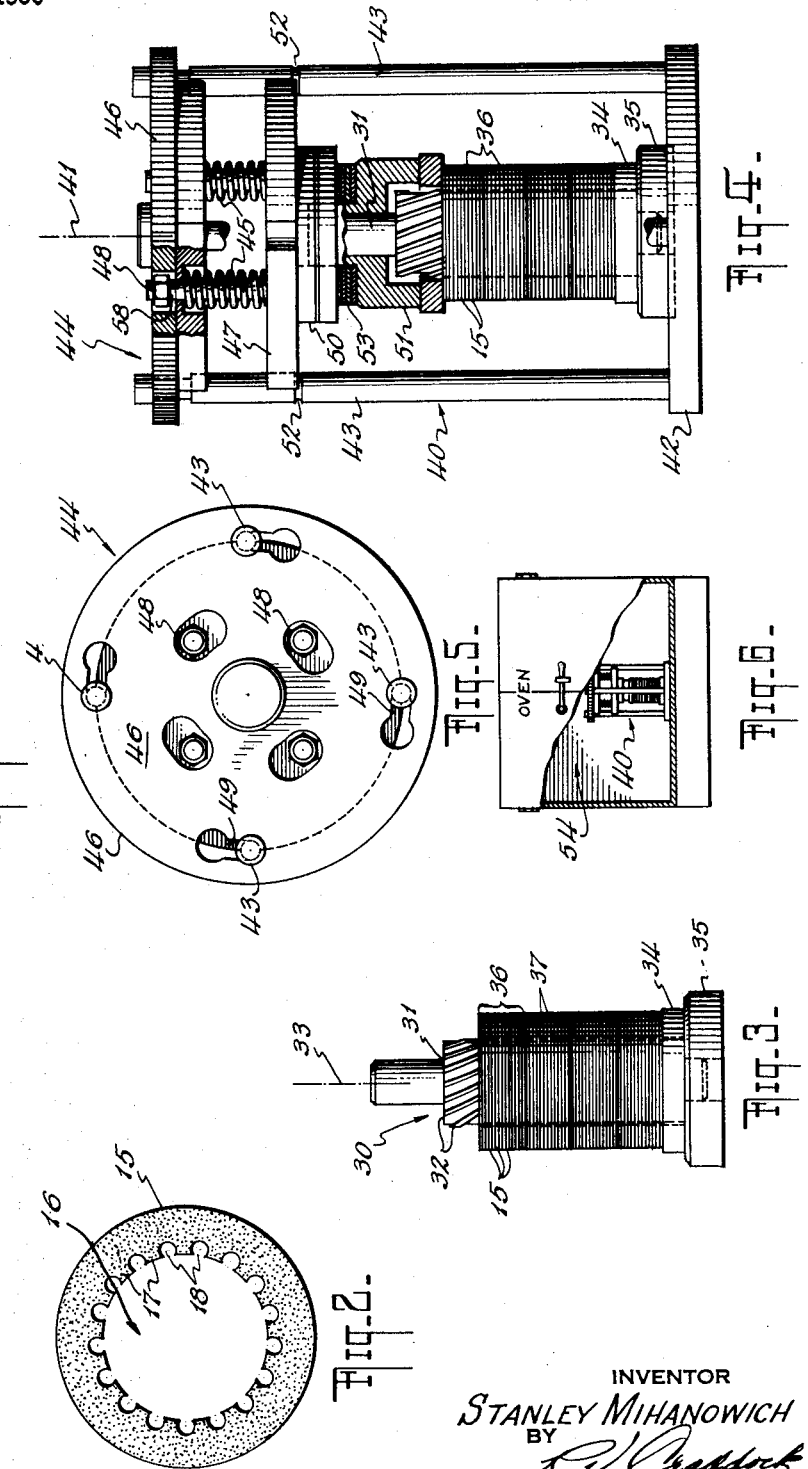
INVENTOR
STANLEY MIHANOWICH
BY
ATTORNEY Dec. 15, 1959  S. MIHANOWICH  2,917,643
ELECTRICAL MACHINE ELEMENT AND METHOD OF MAKING SAME
Filed June 27, 1956  2 Sheets-Sheet 2
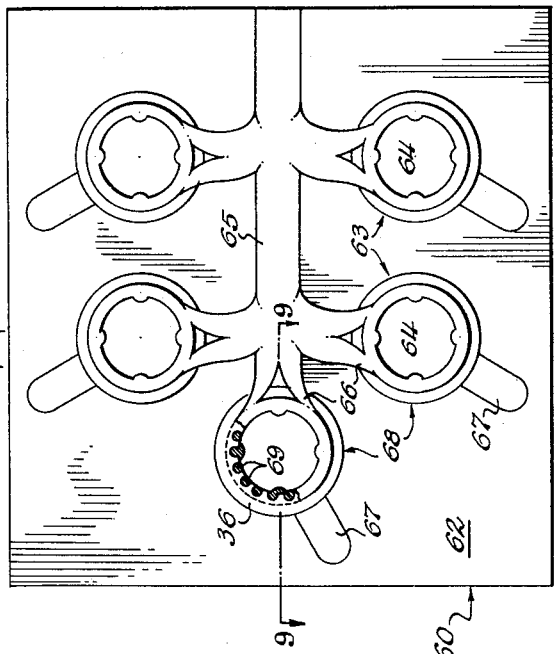
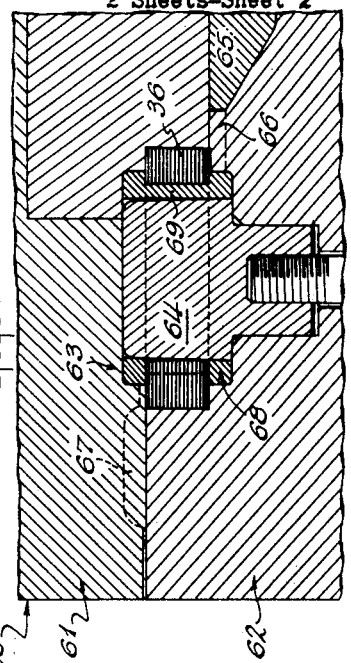
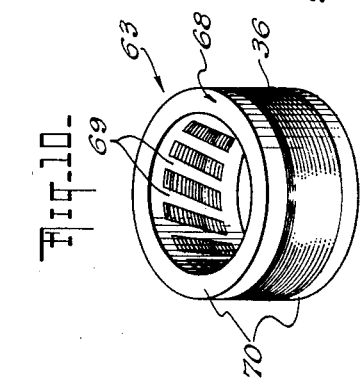
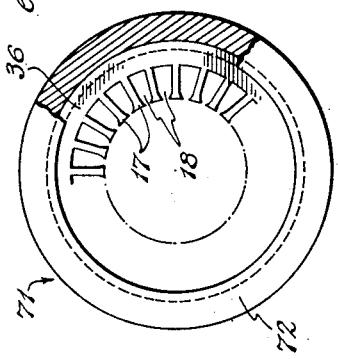
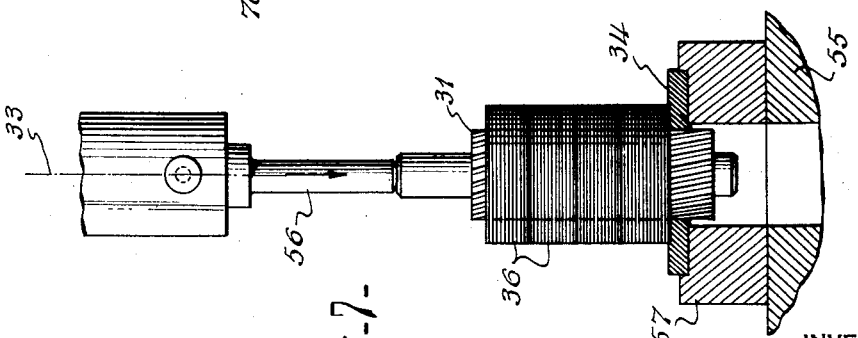
INVENTOR
STANLEY MIHANOWICH
BY
ATTORNEY

United States Patent Office 2,917,643
Patented Dec. 15, 1959

2,917,643

ELECTRICAL MACHINE ELEMENT AND METHOD OF MAKING SAME

Stanley Mihanowich, Glendale, N.Y., assignor to Sperry Rand Corporation, a corporation of Delaware Application June 27, 1956, Serial No. 594,147

3 Claims. (Cl. 310—42)

This invention relates to electrical motor elements and refers particularly to the construction and method of making laminated electrical motor elements such as rotors and stators.

The electrical machine elements to which this invention relates consist generally of a core comprising a quantity or stack of steel circular laminations, each lamination having substantially the same dimensions and a centrally located aperture. The lamination stack is formed of a plurality of concentrically mounted laminations; the stack height being determined by the particular motor requirements. The laminations may be mounted with the lamination petals either in a straight line or skewed to a prescribed helix. During casting or other suitable process, the laminations comprising the stack must be held in position such that the metal forming the matrix is allowed to flow through the slots formed by the lamination petals or to be masked out in conformance with motor requirements.

There are several conventional methods of manufacturing electrical machine elements. One of the methods includes stacking a plurality of laminations on a mandrel to a prescribed height. The mandrel may have a skewed arbor in which case the lamination petals are aligned to establish a helix angle. The lamination stack with the skewed arbor or mandrel therein is placed in a steel shell. The edge of the shell is peened over the end laminations to maintain the helix angle of the laminations by crimping the laminations together. The skewed arbor is pressed out and the stack of laminations, held together by the steel shell, is cast into an electrical machine element. The steel shell is then removed by sawing through one side and chiseling the remaining parts of the shell to remove it. The cast element is then machined into a finished element. This method suffers from the disadvantage of requiring a separate perishable shell for each lamination stack merely for the purpose of holding the laminations together and aligned. When peening over the shell, the laminations may flare out thereby ruining the element.

A second conventional method requires that a stack of laminations be placed on a skewed arbor to establish a helix angle as before. The stacked laminations with the skewed arbor therein are placed in a clamping fixture and clamped. The skewed arbor is then pressed out and a die-casting arbor is pressed in. The die-casting arbor with the laminations thereon is placed in a suitable die-casting die and the electrical machine element is cast in a conventional die-casting process. After casting, the element containing the die-casting arbor is machined. After the first machining operation, the die-casting arbor is pressed out and inspected. If satisfactory, the element is completely machined while the die-casting arbor is returned to the die-casting section. There are numerous limitations to this method including the difficulties inherent in pressing out stack aligning arbors and pressing in die-casting arbors. This procedure causes the laminations to become dished or warped thereby making it impossible to maintain close tolerances. The problem becomes acute when the laminations have long petals since the long petals are easily damaged by pressing the arbors in and out of the stack. Die-casting arbors are expensive and highly perishable and must therefore be replaced periodically at a substantial cost. Expensive die maintenance is required to hold the internal diameter of the laminations to a close tolerance to insure a press fit for the die-casting arbor. The laminations which do not maintain a press fit require additional oversize arbors or they must be scrapped. Due to the constant transposition of the die-casting arbors from the die-casting area to the machine area and back to the die-casting area, a large inventory of die-casting arbors is required to maintain continuous production.

A third conventional method of manufacturing the elements requires stacking and aligning the laminations on an arbor as previously described. The aligned stack of laminations is placed in a nest to maintain the aligned condition and clamped therein. The clamped lamination stack is placed in a centrifugal casting machine and cast by a conventional centrifugal casting process after which the nest is removed by tongs from the casting machine and permitted to cool. After cooling the nest is removed and the element is machined as before. The limitations of this method involve the use of a centrifugal casting process which is itself expensive and time consuming. The equipment and fixtures required for centrifugal casting are also relatively expensive. This method of casting usually produces excessive matrix metal that requires additional machining. In general, when it is desired to hold close tolerances, the foregoing methods are difficult to adapt to a multiple casting process.

The present invention overcomes the limitations cited above. Briefly, in a preferred form, the method of constructing electrical machine elements using the present invention includes bonding the laminations together to form a solid unit and thereby increasing the structural rigidity of the lamination stack for improved results during the critical steps of the process. In one form of the invention, the laminations are coated with a bonding agent, the coated laminations are dried, a predetermined plurality of the coated and dried laminations are stacked and aligned, the laminations are then bonded together, and finally the laminations are embedded in a supporting matrix to form an electric machine element.

The present invention enjoys several important advantages over the prior art methods. These advantages include the elimination of perishable fixtures and arbors required by the aforesaid prior art methods. The present invention minimizes distortion or warping of the laminations due to pressing the arbors into and out of the lamination stack since, after the laminations are bonded, the lamination stack is an integral bonded unit rather than merely a plurality of thin fragile laminations. This method also eliminates the necessity of maintaining an inventory of die-casting arbors that are expensive and highly perishable. Since it is not necessary to maintain a close tolerance on the internal diameter of the laminations, maintenance and operation costs are reduced. This method produces a cast element that requires fewer and simpler operations. An unacceptable lamination stack is noticeable prior to casting rather than after the first machining operation as in the prior art methods. The use of a bonded lamination stack permits the use of a multiple cavity die-casting process that is impractical with any of the aforementioned prior art methods. This method is adaptable for the manufacture of both rotor and stator elements of an electrical machine and affords unusual possibilities for new motor design especially in precision motors requiring a more accurate rotor and stator assembly. This process produces a balanced rotor with greater dimensional uniformity and symmetry of end rings at a lower production cost than the prior art methods.

Accordingly it is an object of the invention to provide an improved method for constructing a cast electrical machine element.

It is a further object of the invention to obtain a stronger, more accurate precision electrical machine element less expensively.

It is another object of the invention to provide a stack of laminations bonded together to form a self-supporting accurately dimensioned portion of an electrical machine element.

These and other objects of the invention will become apparent from the description and the drawings of the invention.

An understanding of the invention will appear more fully from the following description of the invention in a preferred embodiment when read in conjunction with the drawings illustrating the embodiment, in which like parts are designated by life reference characters, and in which:

Fig. 1 is a flow diagram showing the steps in the process of making a cast electrical machine element in accordance with a preferred mode of practicing the invention;

Fig. 2 is a plan view of a typical lamination;

Fig. 3 is a side elevation view of a stack aligning fixture;

Fig. 4 is a side elevation view partially in section of a stack compressing fixture;

Fig. 5 is a plan view of the stack compressing fixture of Fig. 4;

Fig. 6 is a side elevation view showing the compressing fixture of Fig. 4 in an oven;

Fig. 7 is a side elevation view partially in section showing the removal of the bonded laminations from the aligning fixture;

Fig. 8 is a plan view of the lower portion of a multiple die after the casting operation showing the cast elements therein and showing one of the cast elements partially in section;

Fig. 9 is a cross-sectional view through one chamber of the die of Fig. 8 with the upper portion of the die in place, the section being taken along line 9—9 of Fig. 8;

Fig. 10 is a perspective view of a finished cast rotor element; and

Fig. 11 is a plan view partially in section of a finished cast stator element.

The process of the present invention is generally indicated in the flow diagram of Fig. 1, wherein laminations are shown as the initial items entering into the process, going through several operations and finally emerging as a finished element. A quantity or stack of laminations generally comprises a core of an electrical machine element such as a rotor or stator. A lamination 15, as indicated in Fig. 2, usually consists of a thin circular steel disc punched from a strip of sheet steel or other suitable material. Each lamination 15 in a particular stack has substantially the same internal and external dimensions including a centrally located aperture 16. Depending upon the particular motor requirements and whether the lamination will ultimately form a portion of a rotor or stator, the petals 17 and slots 18 may surround the internal or external circumference of the lamination.

Referring again to Fig. 1, in a preferred mode of the invention, the steps of the process include coating the laminations as indicated at 20. The laminations are coated on one or both sides, depending upon their use to be more fully described later, with a suitable bonding agent which may be a thermosetting plastic or phenolic adhesive. One suitable bonding agent, for example, is a phenolic adhesive consisting of Butyl-N rubber in a phenolic adhesive dissolved in alcohol toluene solvent solution which may be procured from the Chrysler Corporation under the name of Cycleweld Cement #55–9–100. After coating, depending upon the bonding agent, the laminations may be dried. Both operations may be accomplished in a suitable machine such as the Motor Lamination Coating Apparatus disclosed in Patent No. 2,685,271 of E. E. Essen, issued August 3, 1954, and assigned to the same assignee as the present invention. In a preferred form of the invention, the coated laminations are dried prior to the subsequent operations. However, depending upon the type of process and the bonding agent used, it may be desirable to eliminate the drying process.

The laminations, after being coated and dried, are stacked and aligned as indicated in box 21 of Fig. 1. The stack aligning fixture 30 shown in Fig. 3 consists of a cylindrical stack aligning arbor or mandrel 31 having splines 32 disposed either parallel or helical with respect to the longitudinal axis 33 of the arbor 31, depending upon the motor requirements. For purposes of exemplification, the process of the present invention will be discussed in terms of a squirrel cage rotor for an aircraft instrument gyroscope motor having its laminations skewed such that the slots form a prescribed helix. The stack aligning fixture 30 indicated in Fig. 3 comprises the aforesaid aligning arbor 31 having helical splines 32 therein mounted on a stripping plate 34 that in turn is mounted on a support plate 35. The stripping plate 34 has a centrally located aperture of substantially the same diameter as the outside diameter of the stack aligning arbor 31. The outside diameter of the stripping plate 34 is slightly greater than the outside diameter of the laminations 15. The support plate 35 has a centrally located aperture of substantially the same diameter as the shaft extremities of the stack aligning arbor 31. The purpose of the support plate 35 is to support the arbor 31 in a vertical position as viewed in the drawing during the initial steps of the process.

A plurality of laminations whose height is determined by the particular motor requirements is mounted concentrically along the longitudinal axis 33 of the stack aligning fixture 30 to form a lamination stack 36 indicated by a bracket. The lamination petals 17 are aligned by the helical splines 32, thereby forming the slots 18 of the lamination stack 36 in a prescribed helix. By coating the end laminations of each stack on one side only, a multiplicity of stacks may be mounted on a single arbor as indicated by the heavy lines 37 that are representative of the end laminations.

The stacked and aligned laminations 15 are then compressed by a suitable means as indicated by box 22 of Fig. 1. For this purpose, a compressing fixture 40 as indicated in Figs. 4 and 5 may be used. In a preferred embodiment, the aligning fixture 30 is mounted within the compressing fixture 40 so that the longitudinal axis of the aligning fixture 30 is substantially coincident with the longitudinal axis 41 of the compressing fixture 40. The function of the compressing fixture 40 is to compress the laminations 15 by the application of a predetermined and preferably constant force for a prescribed period while maintaining the laminations in a stacked and aligned condition. The compressing fixture 40 consists of a base plate 42 upon which the support plate 35 of the aligning fixture 30 is mounted. Attached to the base plate 42 of the compressing fixture 40 are supporting guide rods 43 that are cooperable with the pressure head 44 of the compressing fixture to guide and lock the pressure head.

The function of the pressure head 44 is to apply a predetermined constant force to the lamination stacks 36. To accomplish this, the pressure head 44 has resilient means indicated as springs 45 coupled between the locking plate 46 and a spaced parallel lower plate 47, the entire assembly being concentrically disposed with respect to the longitudinal axis 41 of the compressing fixture 40. Adjusting nuts 48 are positionally mounted on suitable studs 58 to adjust the position of lower plate 47 relative to locking plate 46. The upper extremities of the guide support rods 43 are undercut and cooperable with slots 49 in the pressure head 44 to form a locking means, such that when the pressure head is suitably rotated, the slots in the pressure head will be engaged by the extremities of the guide rods thereby preventing movement of the pressure head locking plate 46 along the longitudinal axis 41. The lower plate 47 of the pressure head 44 rests upon a thrust bearing 50 whose function is to absorb the rotational movement due to compressing the laminations 15 while they are skewed along the helical splines 32. The thrust bearing 50 is concentrically mounted with respect to the longitudinal axis 41 of the compressing fixture 40. Also concentrically mounted along the longitudinal axis 41 of the compressing fixture 40 is a pressure sleeve 51 disposed to transmit the force from the thrust bearing 50 to compress the lamination stacks 36. The pressure sleeve 51 applies a force in a direction parallel to the longitudinal axis 41 and is mounted adjacent the upper end lamination of the stack 36. To assure that substantially the same force is applied to each lamination stack, the bottom edge of the lower plate 47 is aligned between graduation marks 52 on the guide rods 43. If necessary, shims 53 may be placed between the thrust bearing 50 and the pressure sleeve 51 to achieve this result. The compressing fixture 40, when all the components are in place, as indicated in Fig. 4, is then operated by applying a downward force on the locking plate 46 and simultaneously rotating the locking plate to engage the guide rods 43 within the slots 49, thereby locking the pressure head 44 and maintaining a constant resilient force on the lamination stacks 36 until the pressure head 44 is unlocked. For a certain motor requirement, for example, the pressure exerted on the stacked laminations when the pressure head is locked amounts to approximately 225 lbs.

The next step in the process is to cause the bonding agent to become effective in cementing or bonding the stacked and aligned laminations into an integral stack as indicated by box 23 of Fig. 1. The bonding of the laminations might be accomplished in various ways depending upon the type of bonding agent used. In a preferred mode of practicing the invention, the stacked and aligned laminations are baked under pressure until the laminations are cemented together.

As indicated in Fig. 6, the compressing fixture 40 with the coated lamination stacks 36 therein under pressure as previously described is inserted in a suitable baking fixture such as oven 54 and baked for a predetermined length of time. In one instance, for example, using the aforementioned Cycleweld Cement as the bonding agent, the baking interval is approximately one hour at a temperature of approximately 325 degrees Fahrenheit. At the end of the baking period, the laminations have been bonded together to form a multiplicity of integral lamination stacks whose individual stack height is determined by the location of the adjacent uncoated end laminations.

Upon completion of the bonding process, the compressing fixture 40 is removed from the oven 54 or other suitable device. By unlocking the pressure head 44 and removing the thrust bearing 50, shims 53, if any, and pressure sleeve 51; the stack aligning arbor 31 with the bonded stacks 36 thereon may be removed from the compressing fixture 40 along with the stripping plate 34 and support plate 35.

The next step involves removing the bonded lamination stacks as indicated in box 24 of Fig. 1 from the stack aligning arbor. The support plate 35 is removed from the stack aligning arbor 31 and a knockout plate 57 is substituted therefor as indicated in Fig. 7. The knockout plate 57 has a centrally located aperture having an aperture diameter slightly larger than the outside diameter of arbor 31. The outside diameter of the knockout plate 57 is slightly larger than the outside diameter of the stripping plate 34 and preferably has a recess therein for holding the stripping plate 34. The knockout plate 57 is mounted on a suitable base 55 having an aperture therein cooperable with the aperture in the knockout plate for allowing the stack aligning arbor 31 to pass through. Stripping plate 34 is in turn mounted on knockout plate 57 in such a manner that upon the application of a force, as indicated by the arrow in Fig. 7, through a suitable force applying means 56 to the aligning arbor 31, the lamination stacks 36 will be stripped or removed from the aligning arbor. By applying a suitable compressing force against the arbor 31 and the stripping plate 34 as shown, the aligning arbor 31 is pressed through the openings in the bonded lamination stacks 36, stripping plate 34, knockout plate 35 and base 55, while the stripping plate restrains the lamination stacks 36. As opposed to the prior art methods of pressing the aligning arbors out of the laminations while the laminations are in a relatively loose condition, the present invention presses out the aligning arbor subsequent to bonding the laminations into a rigid integral unit thereby minimizing damage to the laminations. The lamination stacks 36 can then be separated with each stack height being determined by the location of the uncoated adjacent end laminations as explained previously. At this stage in the process, each stack is an integral rigid unit which may be handled as an entity without the necessity of any additional equipment or fixtures to maintain the helical alignment of the individual laminations or petals. By the aforementioned bonding process, each lamination is firmly bonded to the adjacent lamination thereby lending rigidity to the entire structure in lieu of having individual thin laminations susceptible of being easily warped or distorted by the application of pressure or heat.

At this point in the process, the lamination stack may be inspected to determine whether it is acceptable or not rather than requiring a machining operation before the initial inspection of the lamination stack may be made.

The bonded lamination stack may now be treated as a rigid unit and cast in the same manner as any other such unit thereby lending itself to an inexpensive casting process. Preferably, the casting operation, as shown in box 25 of Fig. 1, comprises a die-casting process utilizing a multiple die for casting several electrical machine elements simultaneously. A suitable die 60 is indicated in Figs. 8 and 9 which shows a multiple die having an upper portion 61 and a lower portion 62 for casting five elements 63 simultaneously. Utilizing this method, the lamination stack 36 may be placed upon a suitable core 64 and quickly and easily cast. The core 64 may be interchangeable with other cores to accommodate various size lamination stacks 36. For example, a suitable die 60 that might be used in conventional die casting comprises a replaceable core 64 upon which the lamination stack 36 is mounted having runners 65, gates 66, and vents 67 within the two die sections. In a preferred form of the die 60, the gates 66 allow the molten metal, which forms the supporting matrix 68 of the finished element 63, to flow through two channels as indicated at 66. The purpose of this arrangement is to prevent a concentration of hot molten metal on the end lamination of the stack 36 which may cause the end lamination to warp. The preferred design allows a suitable amount of metal to flow readily to form the matrix 68 and yet does not overheat the end lamination. After the electrical machine element 63, which in this case is a squirrel cage rotor, has been cast, the mold is removed from the die.

Depending upon the casting process, the element 63 may require one or more machining operations as indicated by box 26 of Fig. 1. After the machining operations, the lamination stack 36 with its matrix of conducting material 68 emerges as the finished element 63 indicated in Fig. 10 which may be a rotor for a gyroscopic motor, for example. The metal matrix 68 may consist, for example, of a conducting material, such as aluminum, forming cast conductor bars 69 in the helical slots 18 and having at least one end ring 70 integrally cast with the conductor bars in parallel abutting relation to an extremity of the laminated core or stack 36. The supporting matrix 68 might also take the form of a pair of parallel end rings 70 with conductor bars 69 seated in the bar-receiving slots 18 and bridging the end rings 70.

Utilizing a similar technique, the stator element 71 of an electrical machine might also be cast with the motor frame or housing 72 integral therewith. The finished stator element would then appear as indicated in Fig. 11 comprising a lamination stack 36, frame 72, and slots or openings 18 between petals 17 adapted to receive suitable motor windings, not shown.

The frame 72 comprises a suitable material, such as aluminum, with the stator lamination stack 36 mounted therein such that the cast frame 72 would be in abutting relation with the periphery of the lamination stack 36. In this case, during the casting process, the molten metal would be precluded from flowing through the stator slots 18 by suitable and conventional masking means, not shown.

Thus a method of manufacturing electrical machine elements has been described wherein a plurality of coated laminations are mounted and aligned on a stack aligning arbor, the laminations are bonded together and the stack aligning arbor is then pressed out of the rigid, integral lamination stack. In the prior art methods, the closely fitting stack aligning arbor was pressed out of an unbonded lamination stack causing severe strain and often damage to the fragile laminations. This undesirable condition was accentuated by the use of die-casting arbors which again required pressing the closely fitting die-casting arbors in and out of the unbonded lamination stack. The present invention eliminates the use of a die-casting arbor entirely, and does not require any forced insertion or extraction of a tightly fitting arbor into or out of a plurality of unbonded and fragile laminations.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A method of producing an electrical machine element having a plurality of bonded laminations and a cast supporting matrix comprising the steps of coating each of said laminations with a bonding agent, each of said laminations having a centrally located aperture defined by alternately disposed petals and slots, stacking and aligning a plurality of said coated laminations on a stack aligning arbor having peripherally disposed aligning splines, said petals cooperating with said splines to align said laminations in a predetermined manner, applying a predetermined force to compress the stacked and aligned laminations, bonding the compressed laminations into an integral stack to prevent distortion of the laminations upon removal of the laminations from said arbor, removing the integral stack of laminations from said stack aligning arbor, and casting a supporting matrix about said integral stack of laminations to form an electrical machine element.

2. A method of producing an electrical machine element having a plurality of bonded laminations and a cast supporting matrix comprising the steps of coating each of said laminations with a bonding agent, each of said laminations having a centrally located aperture defined by alternately disposed petals and slots, stacking and aligning a plurality of said coated laminations on a stack aligning arbor having peripherally disposed aligning splines, said petals cooperating with said splines to align said laminations in a predetermined manner, compressing the stacked and aligned laminations by applying a predetermined force thereto, baking the compressed laminations to bond the laminations to each other to form an integral stack of laminations to prevent warping of the laminations upon removal of the laminations from said arbor, removing the integral stack of laminations from said stack aligning arbor, and casting a conductive supporting matrix about said integral stack of laminations to form an electrical machine element.

3. A method of producing an electrical machine element having a plurality of bonded laminations and a cast supporting matrix comprising the steps of coating each of said laminations with a bonding agent, each of said laminations having a centrally located aperture defined by alternately disposed petals and slots, stacking and aligning a plurality of said coated laminations on a stack aligning arbor having peripherally disposed aligning splines, said petals cooperating with said splines to align said laminations in a predetermined manner, compressing the stacked and aligned laminations by applying a predetermined force thereto, bonding the compressed laminations to each other to form an integral stack of laminations to prevent distortion of the laminations upon removal of the laminations from said arbor, removing the integral stack of laminations from said stack aligning arbor, and casting a conductive supporting matrix about said integral stack of laminations to form an electrical machine element, said matrix also forming the current-carrying conductors of said electrical machine element.

References Cited in the file of this patent

UNITED STATES PATENTS

| | | |
|---|---|---|
| 404,465 | Bradley | June 4, 1889 |
| 1,440,952 | Apple | Jan. 2, 1923 |
| 1,921,112 | Apple | Aug. 8, 1933 |
| 2,280,981 | Shuh | Apr. 28, 1942 |
| 2,286,008 | Pfalzgraff | June 9, 1942 |
| 2,304,607 | Sleeter | Dec. 8, 1942 |
| 2,423,869 | Blessing | July 15, 1947 |
| 2,483,024 | Roters | Sept. 27, 1949 |
| 2,490,021 | Aske | Dec. 6, 1949 |
| 2,548,133 | Treat | Apr. 10, 1951 |
| 2,711,492 | Ballman | June 21, 1955 |
| 2,734,140 | Parker | Feb. 7, 1956 |

FOREIGN PATENTS

| | | |
|---|---|---|
| 559,526 | Great Britain | Feb. 23, 1944 |